Oct. 6, 1925.                                                             1,556,537
J. H. MORTIMER
INDEXED REFERENCE CHECK BOOK AND RETURNED CHECK FILE
Filed April 1, 1925          2 Sheets-Sheet 1

J. H. Mortimer
INVENTOR

BY Victor J. Evans
ATTORNEY

WITNESS:

Oct. 6, 1925. 1,556,537
J. H. MORTIMER
INDEXED REFERENCE CHECK BOOK AND RETURNED CHECK FILE
Filed April 1, 1925 2 Sheets-Sheet 2
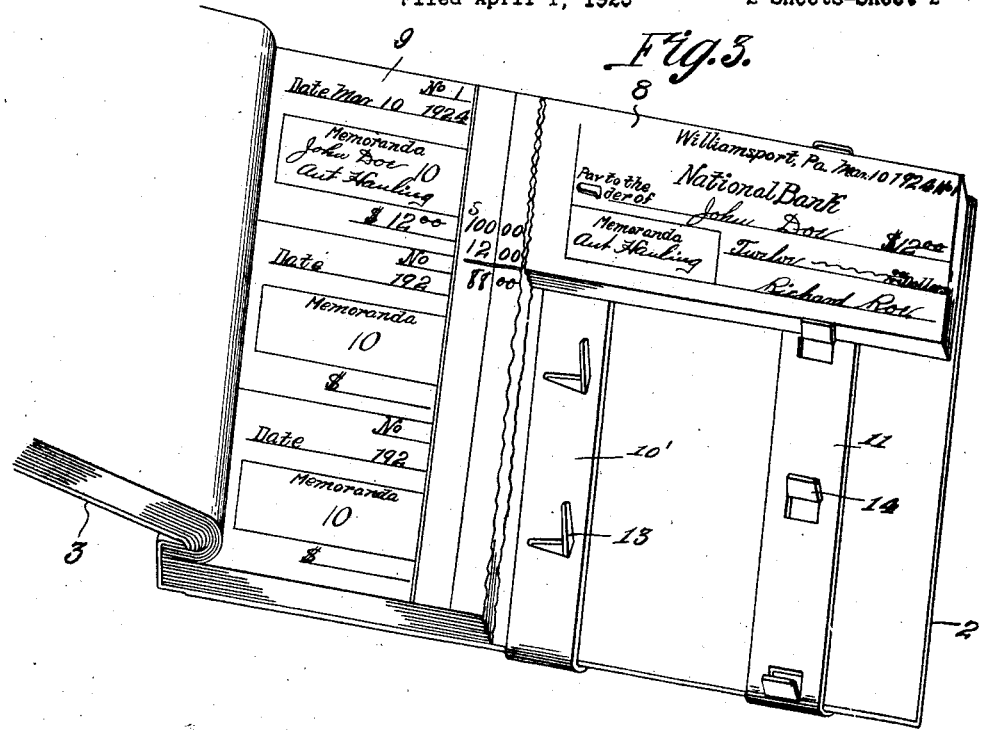
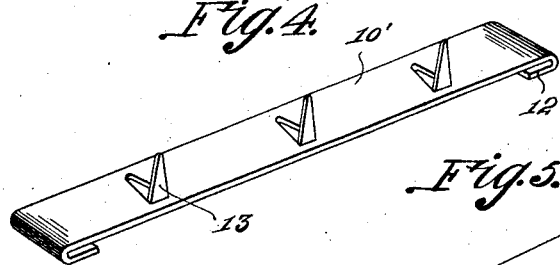
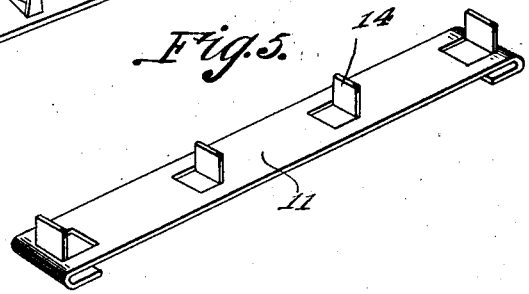
J. H. Mortimer
INVENTOR
WITNESS: ATTORNEY Patented Oct. 6, 1925.

1,556,537

UNITED STATES PATENT OFFICE.

JOHN H. MORTIMER, OF WILLIAMSPORT, PENNSYLVANIA.

INDEXED REFERENCE CHECK BOOK AND RETURNED-CHECK FILE.

Application filed April 1, 1925. Serial No. 19,985.

*To all whom it may concern:*

Be it known that I, JOHN H. MORTIMER, a citizen of the United States, residing at Williamsport, in the county of Lycoming and State of Pennsylvania, have invented new and useful Improvements in Indexed Reference Check Books and Returned-Check Files, of which the following is a specification.

An object of this invention is the provision of a check book by the use of which ready reference may be obtained regarding the issuing of checks as well as the filing of canceled checks in a manner to arrange the same directly opposite and in a line with the stub in the check book from which the check is originally detached.

A further object is the provision of a check book, of a check index, a memorandum printed on the checks and on the stubs for the checks whereby the issuer will have knowledge of the transaction in which the check was given in payment as well as a means for filing and preserving canceled checks in the check book in a position which they originally occupied, that is directly opposite the stubs to which they were originally attached.

A still further and important object is the provision of means for filing and preserving canceled checks in the position they originally occupied in the check book, said means including bendable tongues designed to be passed through the canceled checks and bent thereover, and means, in the nature of lugs for removably sustaining the canceled checks in proper alignment with their stubs, both of said means being arranged on the back cover of the said book.

To the attainment of the above broadly stated objects and others which will appear as the nature of the invention is better understood, reference is to be had to the accompanying drawings, which form part of this application.

In the drawings:—

Figure 1 is a perspective view of a check book in accordance with this invention, the cover page being open.

Figure 2 is a similar view with the check book opened to display, and the stubs therefor.

Figure 3 is a similar view looking at the back page of the book, and showing detached and canceled checks arranged and sustained in the check book directly opposite the stubs to which the checks were originally connected.

Figure 4 is a perspective view of one of the metal plates employed.

Figure 5 is a similar view of the second metal plate employed.

Any desired number of checks and check index pages may be arranged in a check book, and except for the details hereinafter set forth in detail the check book may be of the ordinary construction. The check book is broadly indicated by the numeral 1, but for distinction its back is indicated by the numeral 2 and its front or cover by the numeral 3. In the front part of the book there are arranged any desired number of leaves 4. These leaves are ruled longitudinally and divided by transverse lines into divisions. On the marginal top of each of the leaves 4 there is imprinted the words "Checks index" while above the columns 5 and 6 there is imprinted the words "Name" and "Checks canceled." Also each of the leaves 4 has on its outer edge a tab projection 7, and on these tabs there are imprinted the letters of the alphabet. The columns 5 are designed to have written therein the names of persons to which checks have been issued while the columns 6 have written therein the numbers of the checks. Because of the index tabs 7 the owner of the check book may turn to any of the pages 4 to ascertain the number of a check or checks issued to a person of any name and by consulting the columns 6 he will ascertain the number of such check or checks. Then by turning to the stub or stubs bearing these numbers he will have knowledge of just when and for what purpose the check or checks were issued.

In the check book, next to the check index page 4 there are the detachable checks 8 and the stubs 9 to which they are connected by the usual perforated lines. The checks and stubs are printed in the usual manner but each check and each stub has arranged thereon a space 10. At the top of each of these spaces 10 there is imprinted the word "Memorandum" below which there is written the purpose for which a check is issued.

On the inner face of the back or cover 2 of the check book 1, I arrange spaced metal plates 10′ and 11, respectively. Each of these plates are of thin material and have their ends rounded upon themselves and extended to provide tongues 12 which are bent against the outer face of the cover, the inner portions of the tongues being contacted by the edges of the cover. The plate 10' is formed with equidistantly spaced V-shaped slits and the metal bounded by these slits is bent outwardly to form the said plates with bendable V-shaped tongues 13. These tongues may be bent in the openings provided thereby when not required for filing or attaching to the cover detached and canceled checks or the same may be extended and passed through the perforations in the said checks.

The plate 11 is provided, at equidistantly spaced intervals, with substantially U-shaped slits and the metal bounded by these slits is bent outwardly to form the lugs 14. The tongues 13 on the plate 10' are disposed centrally between the pairs of lugs 14 on the plate 11 and the distance between the respective pairs of lugs 14 equals the width of the checks 8. These lugs 14 may be passed through the perforated lines that divide the checks in the check book when a plurality of checks are arranged in the said check book while the outer lugs contact with the outer edges of the checks.

When the checks have been canceled by the bank and returned to their original owner the same are arranged on the back of the book directly opposite, and, of course, in line with the stubs 9 from which they were detached. In this manner the checks are easily and effectively filed. The stub with the noted information may be evidence to the drawer that he has issued a certain check for a certain amount to a certain person at a certain date and the memorandum informs him of the purpose for which the check is drawn but the return check indorsed by the receiver of said check is positive proof to both parties to the transaction that the bill has been settled and thus both the stub and the filed check clinch the evidence of the transaction.

Preferably a file, such as a telescopic envelope, is employed for retaining the returned canceled checks before the same are attached in the check book.

Having described the invention, I claim:—

1. The combination with a check book, of tongues on the back of the book, spaced lugs also on the back of the book arranged at equidistantly spaced intervals from the respective tongues, said tongues designed to be passed through canceled checks to arrange the same opposite the stubs to which the said checks were originally connected and the lugs designed to also receive said canceled checks therebetween to hold the same in alignment with said stubs.

2. The combination with a check book, of spacing metal plates arranged on the inner face of the back cover of the book and having its ends bent around and over the outer face of said cover, the inner plate having spaced V-shaped bendable tongues, the outer plate having spaced lugs arranged in pairs and equidistant from the center of the respective tongues, said tongues designed to be passed through and bent over canceled checks to arrange the same directly opposite the stubs to which they were originally connected and the said checks designed to be received between the pairs of lugs for holding said checks in alignment with said stubs.

3. The combination with a check book, of bendable means on the inner face of the back cover thereof designed to pierce and sustain on the cover canceled checks in coaxial alignment with the stubs from which the checks were detached and means also on the cover for contacting with the edges of said canceled checks.

In testimony whereof I affix my signature.

JOHN H. MORTIMER.